(12) United States Patent
Tokizaki et al.

(10) Patent No.: US 11,436,706 B2
(45) Date of Patent: Sep. 6, 2022

(54) IMAGE PROCESSING APPARATUS AND IMAGE PROCESSING METHOD FOR IMPROVING QUALITY OF IMAGES BY REMOVING WEATHER ELEMENTS

(71) Applicant: SONY CORPORATION, Tokyo (JP)

(72) Inventors: Yuki Tokizaki, Tokyo (JP); Satoshi Kawata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 16/979,797

(22) PCT Filed: Dec. 7, 2018

(86) PCT No.: PCT/JP2018/045093
§ 371 (c)(1),
(2) Date: Sep. 10, 2020

(87) PCT Pub. No.: WO2019/181096
PCT Pub. Date: Sep. 26, 2019

(65) Prior Publication Data
US 2021/0042886 A1     Feb. 11, 2021

(30) Foreign Application Priority Data

Mar. 19, 2018   (JP) .............................. JP2018-050911

(51) Int. Cl.
*G06T 5/00*      (2006.01)
*G06T 7/55*      (2017.01)
(Continued)

(52) U.S. Cl.
CPC ................. *G06T 5/002* (2013.01); *G06T 5/20* (2013.01); *G06T 7/13* (2017.01); *G06T 7/55* (2017.01); *G06T 7/70* (2017.01)

(58) Field of Classification Search
None
See application file for complete search history.

(56) References Cited

U.S. PATENT DOCUMENTS 9,342,899 B2 *  5/2016  Gao .................... H04N 5/2354
9,761,003 B2 *  9/2017  Wang ..................... G06T 7/285
(Continued)

FOREIGN PATENT DOCUMENTS

DE    102004010908 A1    9/2004
JP    2004-289786 A      10/2004
(Continued)

OTHER PUBLICATIONS

D. Chen, C. Chen and L. Kang, "Visual Depth Guided Color Image Rain Streaks Removal Using Sparse Coding," in IEEE Transactions on Circuits and Systems for Video Technology, vol. 24, No. 8, pp. 1430-1455, Aug. 2014, doi: 10.1109/TCSVT.2014.2308627. (Year: 2014).*

(Continued)

*Primary Examiner* — Andrae S Allison
(74) *Attorney, Agent, or Firm* — Chip Law Group

(57) ABSTRACT

Provided is an image processing apparatus that includes an image processing section that executes filter processing using a filter coefficient. The filter coefficient is set at least on the basis of a detection result for details based on a first image and a detection result of detection of a disturbance performed on a second image.

17 Claims, 11 Drawing Sheets

(51) Int. Cl.
  *G06T 7/13* (2017.01)
  *G06T 7/70* (2017.01)
  *G06T 5/20* (2006.01)

(56) References Cited

U.S. PATENT DOCUMENTS

| | | | |
|---|---|---|---|
| 10,632,916 B2* | 4/2020 | Stein | B60Q 1/0023 |
| 10,832,382 B2* | 11/2020 | Vandame | G06T 7/593 |
| 2004/0175053 A1 | 9/2004 | Kawamata et al. | |
| 2007/0198955 A1* | 8/2007 | Nagatomo | G06K 9/48 716/100 |
| 2010/0271511 A1* | 10/2010 | Ma | H04N 13/261 348/239 |
| 2011/0032341 A1* | 2/2011 | Ignatov | H04N 13/144 348/51 |
| 2014/0270485 A1* | 9/2014 | Kauff | H04N 13/128 382/154 |
| 2021/0019877 A1* | 1/2021 | Muramatsu | G06T 7/0008 |

FOREIGN PATENT DOCUMENTS

| | | |
|---|---|---|
| JP | 2011-039727 A | 2/2011 |
| JP | 2016-138818 A | 8/2016 |
| JP | 2017-186019 A | 10/2017 |
| WO | 2017/104291 A1 | 6/2017 |

OTHER PUBLICATIONS

Wu, Qi, Wende Zhang, and BVK Vijaya Kumar. "Raindrop detection and removal using salient visual features." 2012 19th IEEE International Conference on Image Processing. IEEE, 2012. (Year: 2012).*

Toa et al., Atmospheric scattering-based multiple images fog removal, 2011 4th International Congress on Image and Signal Processing (Year: 2011).*

International Search Report and Written Opinion of PCT Application No. PCT/JP2018/045093, dated Mar. 12, 2019, 06 pages of ISRWO.

* cited by examiner

FIG. 2A INPUT IMAGE I

FIG. 2B DEPTH IMAGE D

FIRST FILTER COEFFICIENT $a_j$

SECOND FILTER COEFFICIENT $b_j$

THIRD FILTER COEFFICIENT $c_j$

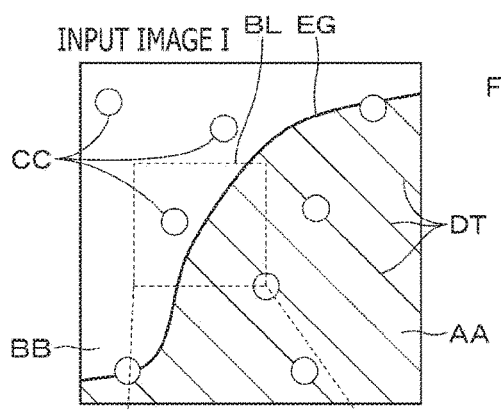
FIG. 3A
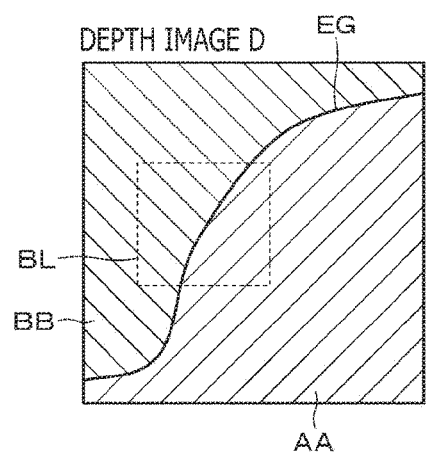
FIG. 3B
FIG. 3C

FIG. 4A

FIG. 4B
COMPUTE FIRST FILTER COEFFICIENT $a_j$ FROM EDGE OF DEPTH IMAGE

| 0 | 0 | 0 | 0.6 | 1 |
|---|---|---|---|---|
| 0 | 0.4 | 0.8 | 1 | 1 |
| 0 | 0 | 0.8 | 1 | 1 |
| 0 | 0 | 0.5 | 1 | 1 |
| 0 | 0 | 0 | 0.8 | 1 |

BL, BB, EG, AA

FIG. 4C
COMPUTE SECOND FILTER COEFFICIENT $b_j$ FROM DETAILS OF INPUT IMAGE

| 0 | 0.2 | 0 | 0 | 0 |
|---|---|---|---|---|
| 0 | 0.1 | 1 | 0.1 | 0.5 |
| 0 | 0 | 0.3 | 0 | 1 |
| 0 | 0 | 0.1 | 0 | 0 |
| 0 | 0 | 0 | 0 | 0 |

BL, DT

COMPUTE THIRD FILTER COEFFICIENT $c_j$ FROM DETECTION RESULT FOR DISTURBANCES

| 1 | 1 | 1 | 1 | 0 |
|---|---|---|---|---|
| 1 | 1 | 1 | 1 | 1 |
| 1 | 0 | 0 | 1 | 1 |
| 1 | 0 | 0 | 1 | 1 |
| 1 | 1 | 1 | 1 | 1 |

FIG. 4D $a_j \times b_j \times c_j$

| 0 | 0.12 | 0 | 1 | 0 |
|---|---|---|---|---|
| 0 | 0.1 | 0.3 | 0.1 | 0.5 |
| 0 | 0 | 0 | 0 | 1 |
| 0 | 0 | 0.05 | 0 | 0 |
| 0 | 0 | 0 | 0 | 0 |

⇒ OUTPUT NORMALIZED FILTER

IMAGE PROCESSING APPARATUS AND IMAGE PROCESSING METHOD FOR IMPROVING QUALITY OF IMAGES BY REMOVING WEATHER ELEMENTS

CROSS REFERENCE TO RELATED APPLICATIONS

This application is a U.S. National Phase of International Patent Application No. PCT/JP2018/045093 filed on Dec. 7, 2018, which claims priority benefit of Japanese Patent Application No. JP 2018-050911 filed in the Japan Patent Office on Mar. 19, 2018. Each of the above-referenced applications is hereby incorporated herein by reference in its entirety.

TECHNICAL FIELD

The present disclosure relates to an image processing apparatus, an image processing method, and a program.

BACKGROUND ART

Images obtained by outdoor image capturing may be subjected to a decrease in visibility due to bad weather or the like. Thus, techniques have been proposed in which raindrops are removed to improve quality of the images (increase visibility) (for example, PTL 1) and in which undulation of a road surface is determined from depth information to allow, depending on a determination result, a road surface area to be displayed in each image even in a poor visibility situation (for example, PTL 2).

CITATION LIST

Patent Literature

[PTL 1]
Japanese Patent Laid-Open No. 2016-138818
[PTL 2]
Japanese Patent Laid-Open No. 2011-039727

SUMMARY

Technical Problem

In such fields, even in a case where disturbances such as raindrops are removed to improve image quality, properties of the image are desired to be maintained as much as possible.

An object of the present disclosure is to provide an image processing apparatus, an image processing method, and a program that can obtain an image free from disturbances such as raindrops with the properties of the image maintained as much as possible.

Solution to Problem

The present disclosure provides, for example, an image processing apparatus including an image processing section configured to execute filter processing using a filter coefficient set at least on the basis of a detection result for details based on a first image and a detection result of detection of a disturbance performed on a second image.

The present disclosure provides, for example, an image processing method including executing, by an image processing section, filter processing using a filter coefficient set at least on the basis of a detection result for details based on a first image and a detection result of detection of a disturbance performed on a second image.

The present disclosure provides, for example, a program causing a computer to execute an image processing method including executing, by an image processing section, filter processing using a filter coefficient set at least on the basis of a detection result for details based on a first image and a detection result of detection of a disturbance performed on a second image.

Advantageous Effects of Invention

According to at least one embodiment of the present disclosure, an image can be obtained that is free from disturbances such as raindrops with the properties of the image maintained as much as possible. The effects described here are not necessarily limited and may include any of the effects described in the present disclosure. Additionally, the illustrated effects are not intended to limit interpretation of the contents of the present disclosure.

BRIEF DESCRIPTION OF DRAWINGS

FIG. 2A is a diagram depicting an example of an input image according to the first embodiment. FIG. 2B is a diagram depicting an example of a depth image according to the first embodiment.

FIG. 3A is a diagram depicting an example of an input image according to the first embodiment. FIG. 3B is a diagram depicting an example of a depth image according to the first embodiment. FIG. 3C is an enlarged diagram depicting a predetermined block in the image depicted in FIG. 3A.

FIG. 4A is a diagram depicting an example of the first filter coefficient. FIG. 4B is a diagram depicting an example of the second filter coefficient. FIG. 4C is a diagram depicting an example of the third filter coefficient. FIG. 4D is a diagram depicting an example of a filter coefficient based on the first, second, and third filter coefficients.

DESCRIPTION OF EMBODIMENTS

Embodiments and the like of the present disclosure will be described with reference to the drawings. Note that the description will be given in the following order.
<General Techniques>
<1. First Embodiment>
<2. Second Embodiment>
<3. Applied Example>
<4. Modified Examples>
<General Techniques>

First, general techniques will be described to facilitate understanding of the present disclosure. As described above, techniques have been proposed in which raindrops are removed to improve quality of the images and in which undulation of a road surface is determined from depth information to allow, depending on a determination result, a road surface area to be displayed in an image even in a poor visibility situation.

However, in the former technique, there is a problem in that median processing using a median filter is executed in processing for removing raindrops, thus leading to a blurred edge and blurred details of the obtained image. Additionally, in the latter technique, there is a problem in that an edge, provided in a depth image, is maintained, whereas details, not provided in the depth image, are blurred. Additionally, there is a problem in that filtering enables a reduction in random noise but fails to remove a disturbance such as a raindrop and snow. In view of these problems, the embodiments of the present disclosure will be described in detail.

1. First Embodiment

<<Configuration Example of Image Processing Apparatus>>
(Sections of Image Processing Apparatus)

Figure 1:
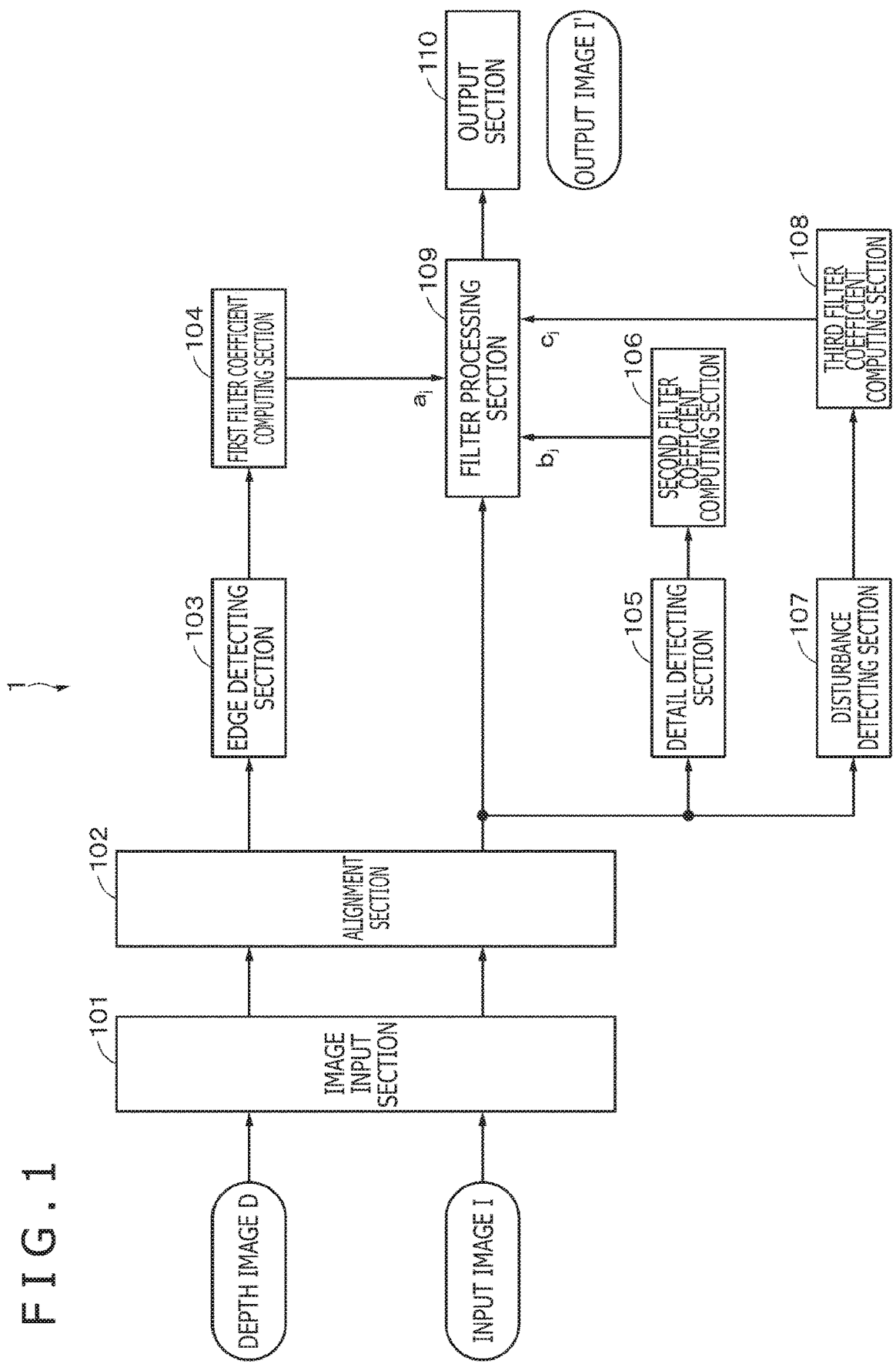
FIG. 1 is a block diagram depicting a configuration example of an image processing apparatus according to a first embodiment.

FIG. 1 is a block diagram depicting a configuration example of an image processing apparatus according to a first embodiment (image processing apparatus 1). The image processing apparatus 1 includes, for example, an image input section 101, an alignment section 102, an edge detecting section 103, a first filter coefficient computing section 104, a detail detecting section 105, a second filter coefficient computing section 106, a disturbance detecting section 107, a third filter coefficient computing section 108, a filter processing section 109 corresponding to an example of an image processing section, and an output section 110.

The image input section 101 is a component to which images are input. The image input section 101 may be an interface for the image processing apparatus 1 or may be a communication section in a case where images are input to the image input section 101 by communication or the like. In the first embodiment, a depth image D and an input image I, for example, synchronously obtained with the same viewpoint are input to the image input section 101. Note that it is acceptable that the viewpoint slightly deviates or the synchronization is slightly inaccurate between the depth image D and the input image I.

The depth image D is an image obtained from a depth sensor such as a millimeter-wave radar, a laser radar, an ultrasonic sensor, or a stereo camera and includes pixels each provided with a depth value. The input image I is, for example, a visible image (visible light image) captured by an image capturing apparatus. Note that the image capturing apparatus may be integrated with or separated from the image processing apparatus 1.

The alignment section 102 aligns the depth image D and the input image I input to the image input section 101. The depth image D processed by the alignment section 102 is output to the edge detecting section 103. Additionally, the input image I processed by the alignment section 102 is diverted to be output to each of the detail detecting section 105, the disturbance detecting section 107, and the filter processing section 109.

The edge detecting section 103 detects an edge on the basis of the depth image D using a known method. The edge detecting section 103 according to the present embodiment detects, on the basis of a pixel value (for example, luminance), how many foreground components (or background components) are included in each pixel. The edge detecting section 103 outputs a detection result for an edge to the first filter coefficient computing section 104.

The first filter coefficient computing section 104 computes a first filter coefficient $a_j$ in such a manner as to leave the edge detected by the edge detecting section 103. Note that a specific example of the first filter coefficient $a_j$ will be described below. The first filter coefficient computing section 104 outputs the computed first filter coefficient $a_j$ to the filter processing section 109.

On the basis of the input image I fed from the alignment section 102, the detail detecting section 105 detects details included in the input image I using a known method. The detail detecting section 105 according to the present embodiment detects, on the basis of the pixel value (for example, luminance), how many detail components of, for example, an object located in the front of the input image I are included in each pixel. The detail detecting section 105 outputs a detection result for the details to the second filter coefficient computing section 106.

The second filter coefficient computing section 106 computes a second filter coefficient $b_j$ in such a manner as to leave the details detected by the detail detecting section 105. Note that a specific example of the second filter coefficient $b_j$ will be described below. The second filter coefficient computing section 106 outputs the computed second filter coefficient $b_j$ to the filter processing section 109.

The disturbance detecting section 107 detects a disturbance(s) included in the input image I fed from the alignment section 102. The disturbances according to the present embodiment are granular (point-like) minute substances flying in the air. Specifically, the disturbance includes at least one of a raindrop, snow, fog, sleet, hailstone, yellow sand, dust, a fly, or a mosquito.

The disturbance detecting section 107 uses a known method suitable for target disturbances to detect disturbances included in the input image I. For example, the disturbance detecting section 107 may detect raindrops or snow by isolated-point detection using information in a time direction. Additionally, the disturbance detecting section 107 may use minimum values for R, G, and B in a local region referred to as a dark channel to estimate the density of haze such as fog or dust and calculate a transmittance from the estimated density of the haze to detect fog or the like. Additionally, as a technique for accurately detecting the transmittance of the haze described above, the applicant has proposed Japanese Patent Application No. 2017-186019. Matters disclosed in this application may be employed to allow the disturbance detecting section 107 to detect fog or the like.

Note that the disturbance detecting section 107 may be enabled to detect, on the basis of the pixel value (for example, luminance), how many disturbance components are included in each pixel.

The third filter coefficient computing section 108 computes a third filter coefficient $c_j$ in such a manner as to cancel the disturbances detected by the disturbance detecting section 107. Note that a specific example of the third filter coefficient $c_j$ will be described below. The third filter coefficient computing section 108 outputs the computed third filter coefficient $c_j$ to the filter processing section 109.

The filter processing section 109 executes filter processing (filtering) using a filter coefficient, on the input image I aligned by the alignment section 102, for example. The filter coefficient used in such filter processing is a coefficient set at least on the basis of the detection result for the details and the detection result for the disturbances and in the embodiments, is a coefficient further set on the basis of the detection result for the edge. More specifically, the filter coefficient is information based on the first filter coefficient $a_j$, the second filter coefficient $b_j$, and the third filter coefficient $c_j$, for example, a coefficient set by normalizing a filter coefficient obtained as a result of multiplying the first filter coefficient $a_j$, the second filter coefficient $b_j$, and the third filter coefficient $c_j$ together. The filter processing section 109 outputs, to the output section 110, an output image I', which is an image obtained by filter processing.

The output section 110 is a display displaying, for example, the output image I'. Note that the output image I' may be displayed on a display provided in an external apparatus different from the image processing apparatus 1. In this case, the output section 110 may be a communication section for transmitting the output image I' to the external apparatus (the communication section may communicate by wire or wirelessly). Additionally, the output image I' may be projected onto an object present in a space, and in this case, the output section 110 may be configured to implement what is called projection mapping.

(Depth Sensor)

As described above, the depth image D may be an image obtained from a depth sensor. Depth sensors can be classified into sensors that transmit disturbances and sensors that transmit no disturbances according to detection capability. An example of the classification is indicated in Table 1.

TABLE 1

| Detection properties | Type of sensor | | | | |
|---|---|---|---|---|---|
| | 77-GHz millimeter-wave radar | 24-GHz millimeter-wave radar | Laser radar | Ultrasonic sensor | Camera |
| Transmittance of disturbance factor | ○ | ○ | x | x | x |

○: Transmitted
x: Not transmitted

Table 1 indicates, as examples of types of the depth sensor, a millimeter-wave radar with a frequency of 77 GHz (gigahertz), a millimeter-wave radar with a frequency of 24 GHz, a laser radar, an ultrasonic sensor, and a camera. Among the illustrated depth sensors, the millimeter-wave radars transmit disturbances. Additionally, among the illustrated depth sensors, the laser radar, the ultrasonic sensor, and the camera are sensors not transmitting disturbances.

The depth image D according to the first embodiment is an image obtained on the basis of a depth sensor transmitting disturbances. In other words, no disturbances appear in the depth image D according to the first embodiment. Thus, in the first embodiment, disturbances are detected in the input image I.

<<Examples of Filter Coefficients>>

Now, specific examples of the filter coefficients used by the filter processing section 109 of the image processing apparatus 1 will be described. FIG. 2A depicts an example of the input image I. The input image I includes an object AA located on a front side, a background BB, and disturbances CC. The disturbances CC in the present example are, for example, raindrops. Additionally, the input image I includes an edge EG of the object AA and details DT of the object AA. In FIG. 2A, the details DT of the object AA are hatched (with a plurality of diagonal lines). Note that, to prevent complicated illustration, only some of the disturbances and the details are denoted by reference signs. This also applies to other figures.

FIG. 2B depicts an example of the depth image D corresponding to the input image I depicted in FIG. 2A. The depth image D includes the object AA located on the front side, the background BB, and an edge EG corresponding to a boundary between the object AA and the background BB. The object AA and the background BB are hatched. Note that the depth image D is an image based on the depth sensor and thus includes the boundary between objects with different distances, that is, the edge EG but does not include the details of the object AA. Additionally, as described above, the depth sensor according to the present embodiment is a sensor that transmits the disturbances CC, and thus, no disturbances CC appear in the depth image D.

Figure 2C:
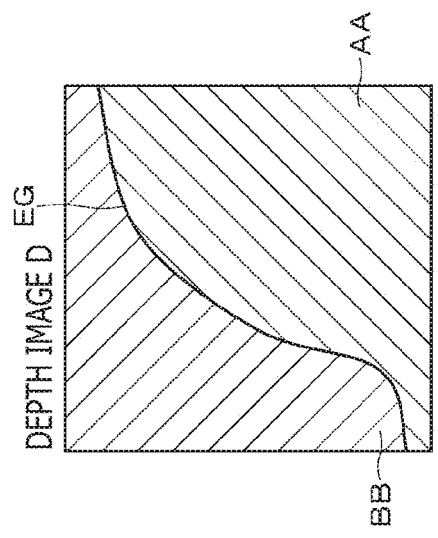
FIG. 2C depicts diagrams referenced when describing processing of computing a first filter coefficient, a second filter coefficient, and a third filter coefficient according to the first embodiment.
Figure 2C:
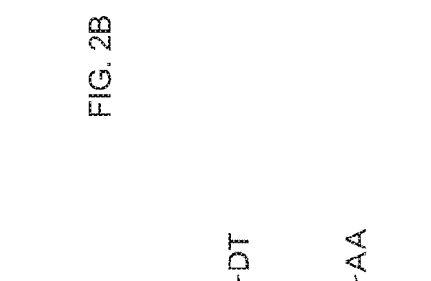
Figure 2C:
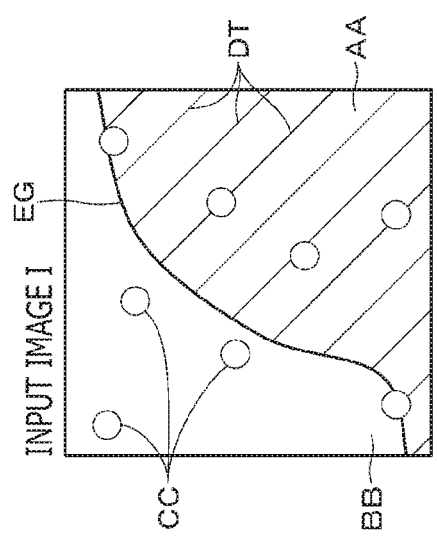

As depicted in FIG. 2C, in the first embodiment, the first filter coefficient $a_j$ is computed (generated) on the basis of the detection result for the edge EG included in the depth image D. Additionally, the second filter coefficient $b_j$ is computed on the basis of the detection result for the details DT included in the input image I. In addition, the third filter coefficient $c_j$ is computed on the basis of the detection result for the disturbances CC included in the input image I. On the basis of the first filter coefficient $a_j$, the second filter coefficient $b_j$, and the third filter coefficient $c_j$, the filter processing section 109 sets a filter coefficient used for filter processing.

The filter coefficient will be described in further detail. FIG. 3A is a diagram depicting the input image I depicted in FIG. 2A, and FIG. 3B is a diagram depicting the depth image D depicted in FIG. 2B. The filter coefficient is set, for example, in units of blocks. The present embodiment will be described using blocks of five pixels x five pixels as an example, but the size of the block can be appropriately changed. In FIGS. 3A and 3B, blocks BL corresponding to the same position in the image are schematically depicted as dotted rectangles. The block BL includes the object AA, the background BB, the disturbances CC, the edge EG, and the details DT.

FIG. 3C is an enlarged diagram depicting a predetermined block BL in the input image I. In the block BL depicted in FIG. 3C, hatched pixels include the disturbances CC (in the present example, raindrops).

The first filter coefficient computing section 104 computes the first filter coefficient $a_j$ on the basis of the detection result for the edge (structure line) of the depth image D. For the first filter coefficient $a_j$, the coefficient is set such that a weight for the coefficient increases (becomes higher) as a quantity of components of the object AA included in the pixel becomes larger. The coefficient may also be set such that the weight for the coefficient decreases (becomes lower) as a quantity of components of the background BB included in the pixel becomes larger.

FIG. 4A depicts an example of the first filter coefficient $a_j$. As depicted in FIG. 4A, for each pixel including only the object AA, "1" is set as a coefficient. Meanwhile, for each pixel corresponding only to the background BB, "0" is set as a coefficient. For each pixel across which the edge EG extends, for example, the coefficient is set according to the degree of components of the object AA included in the pixel. For example, a central pixel of a block (hereinafter referred to as a central pixel, as appropriate) across which the edge EG extends includes relatively many components of the object AA. For such a pixel, for example, "0.8" is set as a coefficient to provide a larger weight. Note that no "0" is set as a coefficient for pixels extending across the edge EG and thus that the edge EG, corresponding to an image property, can be maintained.

The second filter coefficient computing section 106 computes the second filter coefficient $b_j$ on the basis of the detection result for the details included in the input image I. The second filter coefficient $b_j$ is a coefficient having a larger weight (higher weight) set for more details of the object AA included in the input image I.

FIG. 4B depicts an example of the second filter coefficient $b_j$. For example, for the central pixel of the block BL including many details, for example, "1" is set as a coefficient. Additionally, for example, no details are included in the pixel to the left of the central pixel, and thus, for example, "0" is set as a coefficient. In addition, for example, a few details are included in the pixel to the right of the central pixel, and thus, for example, "0.3" is set as a coefficient. Also, details are slightly included in the pixel to the lower side of the pixel, and thus, for example, "0.1" is set as a coefficient. As described above, the weight is applied to each pixel including details (no "0" is set for the pixel as a coefficient), and thus, the details, corresponding to an image property, can be maintained.

The third filter coefficient computing section 108 computes the third filter coefficient $c_j$ on the basis of the detection result for the disturbances provided by the disturbance detecting section 107. The third filter coefficient $c_j$ is, for example, a coefficient set to remove the disturbances CC.

FIG. 4C depicts an example of the third filter coefficient $c_j$. For example, for each pixel including the disturbances CC, for example, "0" is set as a coefficient. For each pixel including no disturbances CC, for example, "1" is set as a coefficient. Accordingly, even in a case where a certain pixel is a pixel corresponding to the disturbances CC, the use of the detection result for the disturbances CC provided by the disturbance detecting section 107 allows the disturbances to be effectively removed from the pixel by inpaint processing.

Note that, as is the case with the edge and the details, the degree of the disturbances included in the pixel may be detected by the disturbance detecting section 107, and the weight for the coefficient may be set in detail according to the degree. In other words, the coefficient set for the pixels including the disturbances is preferably "0" for removing the disturbances but may have a value close to "0."

After receiving of the first filter coefficient $a_j$, the second filter coefficient $b_j$, and the third filter coefficient $c_j$, the filter processing section 109 multiplies these filter coefficients together to generate a filter coefficient. An example of such a filter coefficient is depicted in FIG. 4D. To prevent a fluctuation in the luminance level of the entire image, the filter processing section 109 generates a filter coefficient normalized such that the sum of the filter coefficients depicted in FIG. 4D is 1. The above-described processing is similarly executed on the other blocks BL, and a coefficient is obtained for each pixel. The filter processing section 109 uses a filter with the generated filter coefficient to execute filter processing on the input image I subjected to the alignment, generating an output image I'.

<<Procedure of Processing>>

Figure 5:
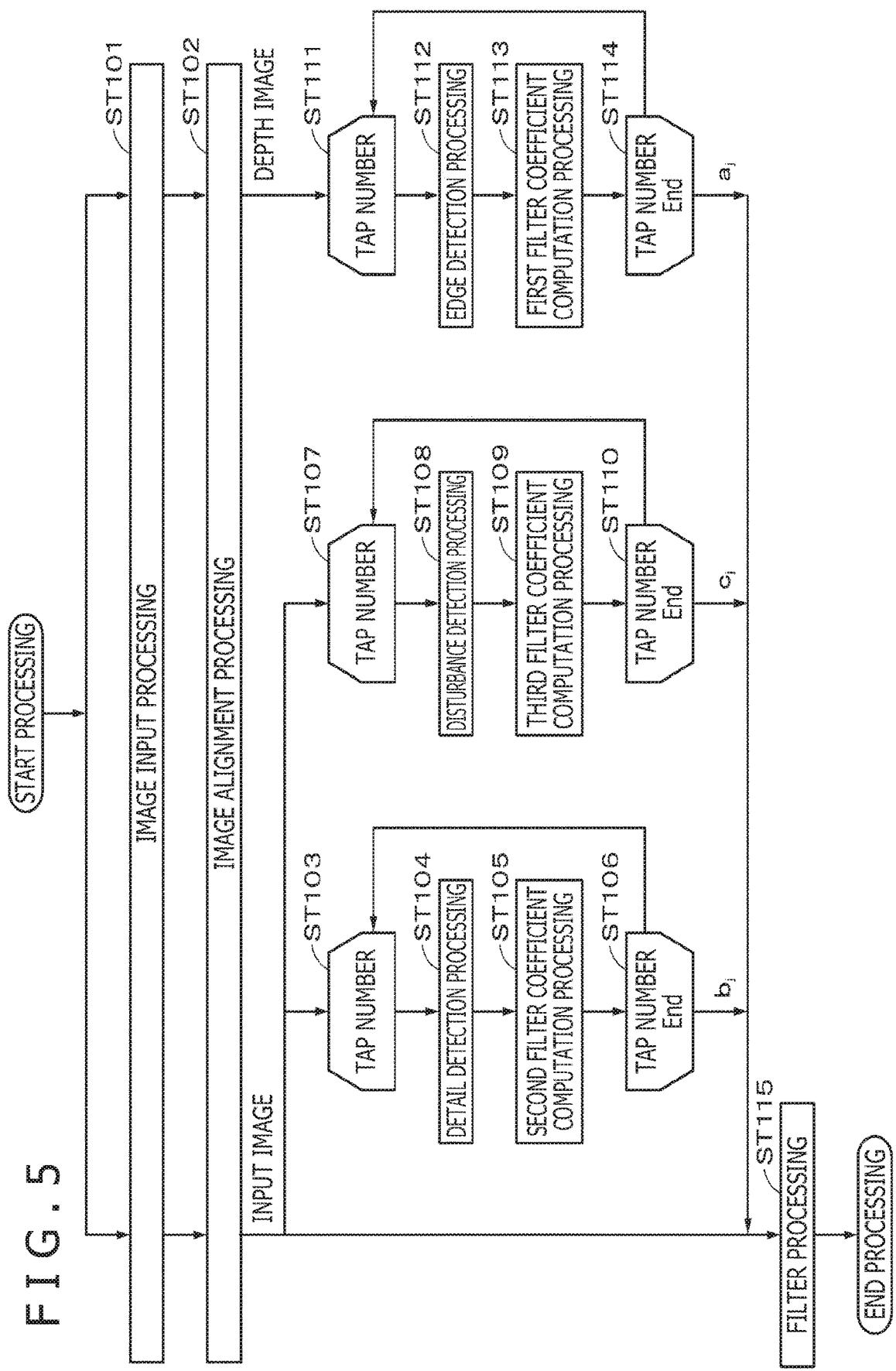
FIG. 5 is a flowchart depicting a procedure of processing executed in the image processing apparatus according to the first embodiment.

With reference to a flowchart in FIG. 5, a procedure of processing executed in the image processing apparatus 1 according to the first embodiment will be described.

In step ST101, image input processing is executed to input the depth image D and the input image I to the image input section 101. Then, the processing proceeds to step ST102.

In step ST102, image alignment processing is executed. In this processing, the alignment section 102 aligns the depth image D with the input image I. The depth image D subjected to the alignment is fed to the edge detecting section 103. Additionally, the input image I subjected to the alignment is fed to each of the detail detecting section 105, the disturbance detecting section 107, and the filter processing section 109. Note that, in the first embodiment, the input image I subjected to the alignment corresponds to a first and a second images.

From step ST103 to step ST106, detail detection processing is executed in which the detail detecting section 105 detects the details included in the input image I subjected to the alignment (step ST104). Then, on the basis of the detection result for the details, second filter coefficient computation processing is executed in which the second filter coefficient computing section 106 computes the second filter coefficient (step ST105). The second filter coefficient computation processing is repeated according to the number of taps of the filter (steps ST103 and ST106). The processing from step ST103 to step ST106 computes the second filter coefficient $b_j$, and the computed second filter coefficient $b_j$ is fed to the filter processing section 109.

From step ST107 to step ST110, disturbance detection processing is executed in which the disturbance detecting section 107 detects disturbances included in the input image I subjected to the alignment (step ST108). Then, on the basis of the detection result for the disturbances, third filter coefficient computation processing is executed in which the third filter coefficient computing section 108 computes the third filter coefficient (step ST109). The third filter coefficient computation processing is repeated according to the number of taps of the filter (steps ST107 and ST110). The processing from step ST107 to step ST110 computes the third filter coefficient $c_j$, and the computed third filter coefficient $c_j$ is fed to the filter processing section 109.

From step ST111 to step ST114, edge detection processing is executed in which the edge detecting section 103 detects an edge on the basis of the depth image D subjected to the alignment (step ST112). Then, on the basis of the detection result for the edge, first filter coefficient computation processing is executed in which the first filter coefficient computing section 104 computes the first filter coefficient (step ST113). The first filter coefficient computation processing is repeated according to the number of taps of the filter (steps ST111 and ST114). The processing from step ST111 to step ST114 computes the first filter coefficient $a_j$, and the computed first filter coefficient $a_j$ is fed to the filter processing section 109.

In step ST115, the filter processing section 109 multiplies the first filter coefficient $a_j$, the second filter coefficient $b_j$, and the third filter coefficient $c_j$ together to generate a filter coefficient. To prevent a fluctuation in the luminance level of the entire image, the filter processing section 109 generates a filter coefficient normalized such that the sum of the filter coefficients is 1. Then, the filter processing section 109 uses a filter with the normalized filter coefficient to execute filter processing on the input image I subjected to the alignment, generating an output image I'. The filter processing executed by the filter processing section 109 can be represented by Equation 1 below.

[Math. 1]

$$I'_i = \frac{1}{Z} \sum_{j \in O(i)} a_j(D_i - D_j) b_j(I_i - I_j) c_j(S_j) I_i \qquad (1)$$

In Equation 1, i denotes the current pixel, j denotes a peripheral pixel of the current pixel, D denotes a depth image, I denotes an input image, S denotes a disturbance detection result, 1/Z denotes normalization processing, and I' denotes an output image.

Note that the filter processing section 109 may execute filter processing each time a coefficient is obtained in units of blocks BL or after coefficients corresponding to all the pixels have been computed.

Note that, although not depicted, the output image I' generated through the filter processing executed by the filter processing section 109 is fed to the output section 110. Then, the output image I' is used in a manner depending on an application by being displayed by the output section 110 or output to the external apparatus.

«Example of Effects»

Figure 6A:
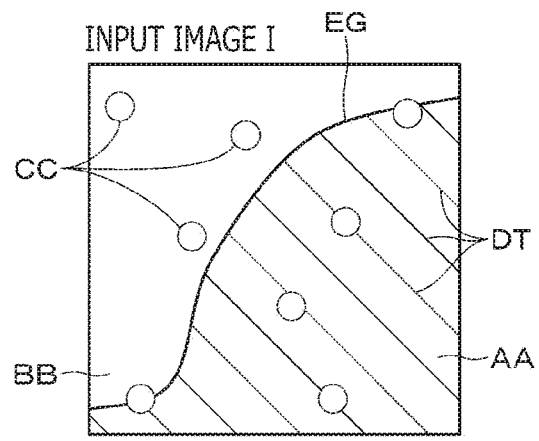
FIGS. 6A and 6B depict diagrams of assistance in describing an example of effects to be produced by the first embodiment.
Figure 6B:
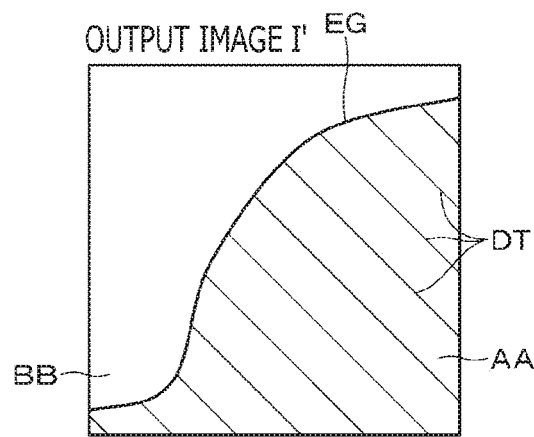

FIGS. 6A and 6B depict diagrams of assistance in describing an example of effects to be produced by the first embodiment. FIG. 6A depicts an example of the input image I, and FIG. 6B depicts an example of the output image I'. In the first embodiment, the weight for the filter is set according to image features (flatness, edges, and the like) of the depth image D and image features of the input image I (flatness, edges, details, and the like), and a filter coefficient that corresponds to the detection result for disturbances is set. More specifically, the filter coefficient is set to maintain the edge and details and is set to remove the detected disturbances. Accordingly, the output image I' obtained by the filter processing corresponds to the image from which the disturbances CC are removed, with the edge EG and the details DT maintained, as schematically depicted in FIG. 6B. Accordingly, even in a case where the image includes the disturbances, the image quality and visibility of images can be improved.

2. Second Embodiment

Now, a second embodiment will be described. Note that the same reference signs as those described in the first embodiment are used for the same components as those described in the first embodiment and components having the same quality as that of the components described in the first embodiment, and duplicate descriptions are omitted, as appropriate. Additionally, unless otherwise specified, the matters described in the first embodiment can be applied to the second embodiment.

A difference of the second embodiment from the first embodiment is that the depth image D according to the second embodiment is an image obtained on the basis of a depth sensor not transmitting disturbances. Accordingly, the depth image D includes disturbances, and thus, in the second embodiment, the disturbances are detected on the basis of the depth image D.

<<Configuration Example of Image Processing Apparatus>>

Figure 7:
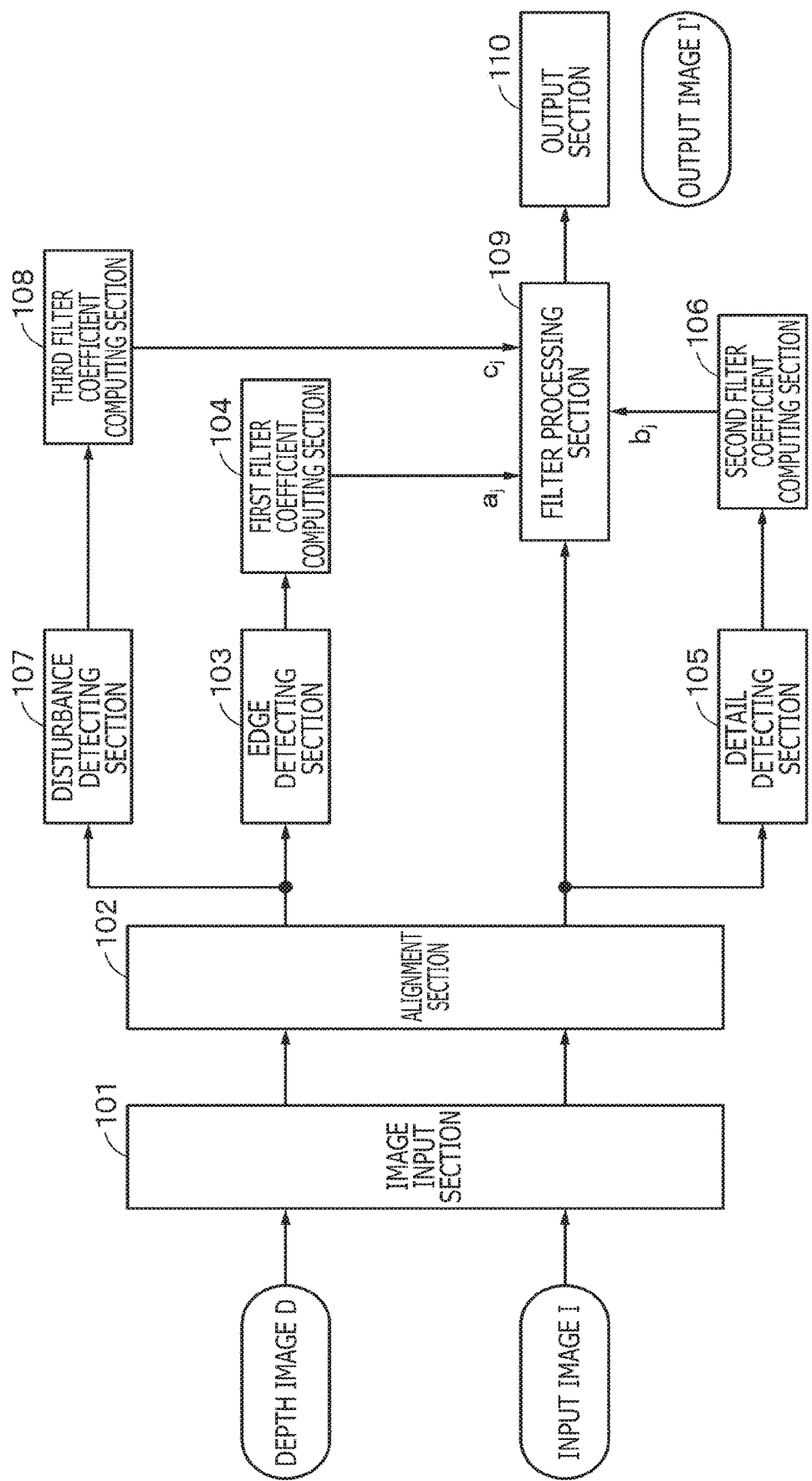
FIG. 7 is a block diagram depicting a configuration example of an image processing apparatus according to a second embodiment.

FIG. 7 is a block diagram depicting a configuration example of an image processing apparatus according to the second embodiment (image processing apparatus 2). The following description focuses on differences between the image processing apparatus 2 and the image processing apparatus 1 according to the first embodiment.

The depth image D and the input image I are input to the image input section 101 provided in the image processing apparatus 2. Then, the alignment section 102 aligns the depth image D with the input image I. In the second embodiment, the depth image D subjected to the alignment is fed to the disturbance detecting section 107. Note that, in the second embodiment, the input image I subjected to the alignment corresponds to a first image, and the depth image D subjected to the alignment corresponds to a second image.

Figure 8A:
FIG. 8A is a diagram depicting an example of an input image according to the second embodiment.
Figure 8B:
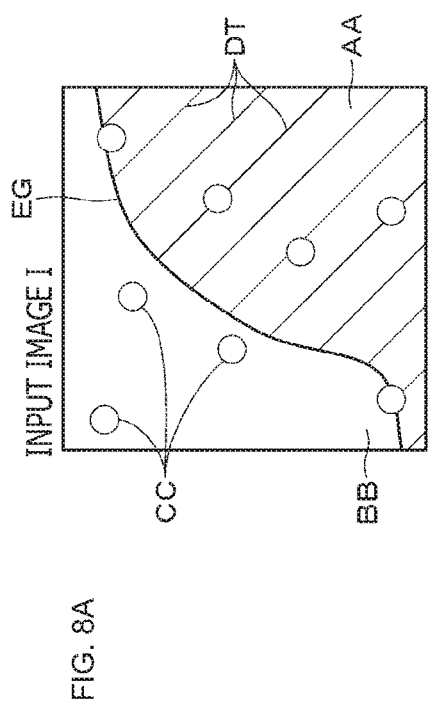
FIG. 8B is a diagram depicting an example of a depth image according to the second embodiment.
Figure 8B:
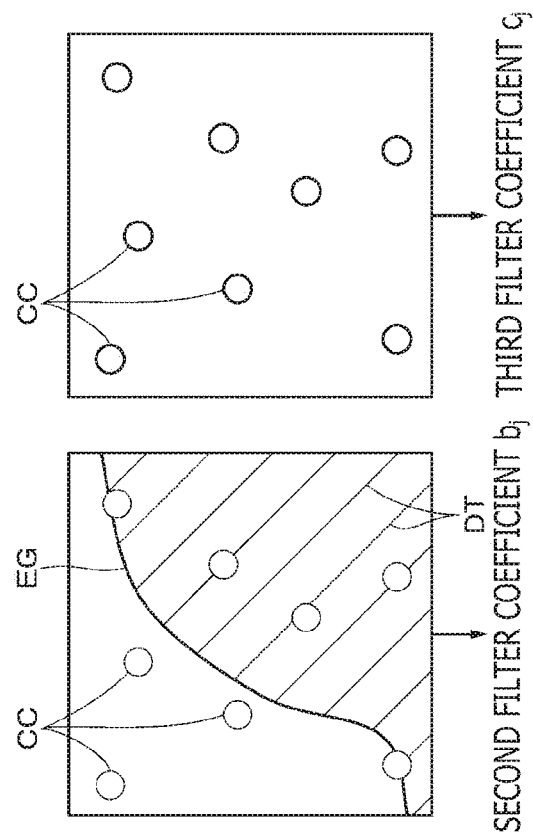
Figure 8C:
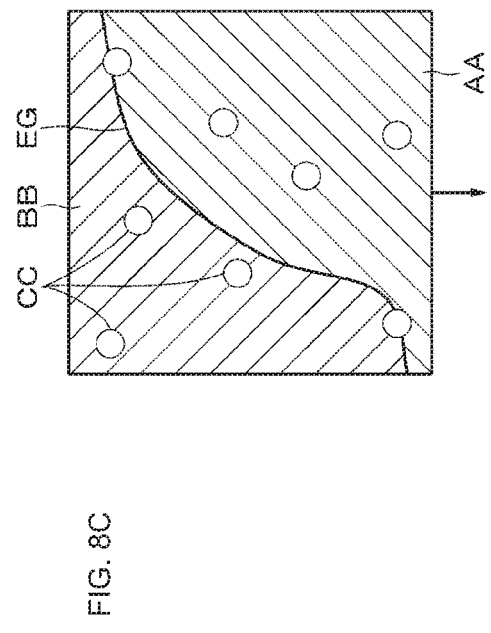
FIG. 8C is a diagram referenced when describing processing of computing a first filter coefficient, a second filter coefficient, and a third filter coefficient according to the second embodiment.

Here, as described above, the depth image D according to the second embodiment is an image obtained on the basis of a depth sensor not transmitting disturbances. Accordingly, the disturbances CC included in the input image I depicted in FIG. 8A is also included (also appears) in the depth image D as depicted in FIG. 8B. The disturbance detecting section 107 detects, on the basis of the depth image D subjected to the alignment, the disturbances included in the depth image D and outputs a detection result to the third filter coefficient computing section 108. As depicted in FIG. 8C, the third filter coefficient computing section 108 computes the third filter coefficient $c_j$ on the basis of the detection result for the disturbances. The operations of the other components are similar to the corresponding operations in the first embodiment, and duplicate descriptions are omitted.

<<Procedure of Processing>>

Figure 9:
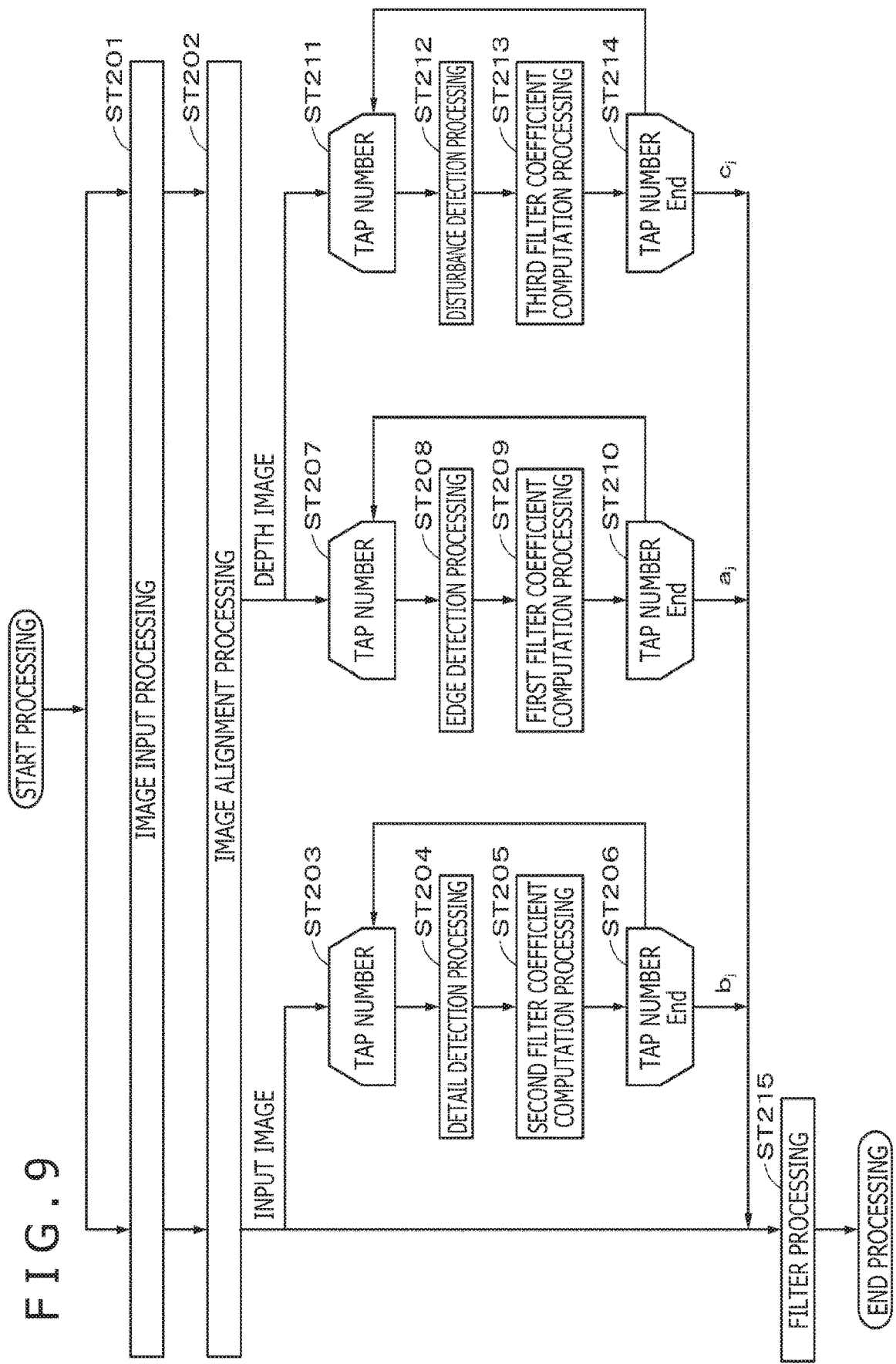
FIG. 9 is a flowchart depicting a procedure of processing executed in the image processing apparatus according to the second embodiment.

With reference to a flowchart in FIG. 9, a procedure of processing executed in the image processing apparatus 2 according to the second embodiment will be described.

In step ST201, the image input processing is executed to input the depth image D and the input image I to the image input section 101. Then, the processing proceeds to step ST202.

In step ST202, the image alignment processing is executed. In this processing, the alignment section 102 aligns the depth image D with the input image I. The depth image D subjected to the alignment is fed to each of the edge detecting section 103 and the disturbance detecting section 107. Additionally, the input image I subjected to the alignment is fed to each of the detail detecting section 105 and the filter processing section 109.

From step ST203 to step ST206, the detail detection processing is executed in which the detail detecting section 105 detects the details included in the input image I subjected to the alignment (step ST204). Then, on the basis of the detection result for the details, the second filter coefficient computation processing is executed in which the second filter coefficient computing section 106 computes the second filter coefficient (step ST205). The second filter coefficient computation processing is repeated according to the number of taps of the filter (steps ST203 and ST206). The processing from step ST203 to step ST206 computes the second filter coefficient $b_j$, and the computed second filter coefficient $b_j$ is fed to the filter processing section 109.

From step ST207 to step ST210, edge detection processing is executed in which the edge detecting section 103 detects edges on the basis of the depth image D subjected to the alignment (step ST208). Then, on the basis of the detection result for the edge, the first filter coefficient computation processing is executed in which the first filter coefficient computing section 104 computes the first filter coefficient (step ST209). The first filter coefficient computation processing is repeated according to the number of taps of the filter (steps ST207 and ST210). The processing from step ST207 to step ST210 computes the first filter coefficient $a_j$, and the computed first filter coefficient $a_j$ is fed to the filter processing section 109.

From step ST211 to step ST214, the disturbance detection processing is executed in which the disturbance detecting section 107 detects disturbances included in the depth image D subjected to the alignment (step ST212). Then, on the basis of the detection result for the disturbances, the third filter coefficient computation processing is executed in which the third filter coefficient computing section 108 computes the third filter coefficient (step ST213). The third filter coefficient computation processing is repeated according to the number of taps of the filter (steps ST211 and ST214). The processing from step ST211 to step ST214 computes the third filter coefficient $c_j$, and the computed third filter coefficient $c_j$ is fed to the filter processing section 109.

In step ST215, the filter processing section 109 multiplies the first filter coefficient $a_j$, the second filter coefficient $b_j$, and the third filter coefficient $c_j$ together to generate a filter coefficient. To prevent a fluctuation in the luminance level of the entire image, the filter processing section 109 generates a filter coefficient normalized such that the sum of the filter coefficients is 1. Then, the filter processing section 109 uses a filter with the normalized filter coefficient to execute the filter processing on the input image I subjected to the alignment, generating an output image I'.

Note that, although not depicted, the output image I' generated as a result of the filter processing executed by the filter processing section 109 is fed to the output section 110. Then, the output image I' is used in a manner depending on the application by being displayed by the output section 110 or output to the external apparatus.

In the above-described second embodiment, effects similar to the effects of the first embodiment can be obtained.

3. Applied Example

A technique according to the present disclosure can be applied to various products. For example, the technique according to the present disclosure may be implemented as an apparatus mounted in any type of moving body such as an automobile, an electric car, a hybrid electric car, a motorcycle, a bicycle, a personal mobility, an airplane, a drone, a ship, a robot, a construction machine, or an agricultural machine (tractor).

Figure 10:
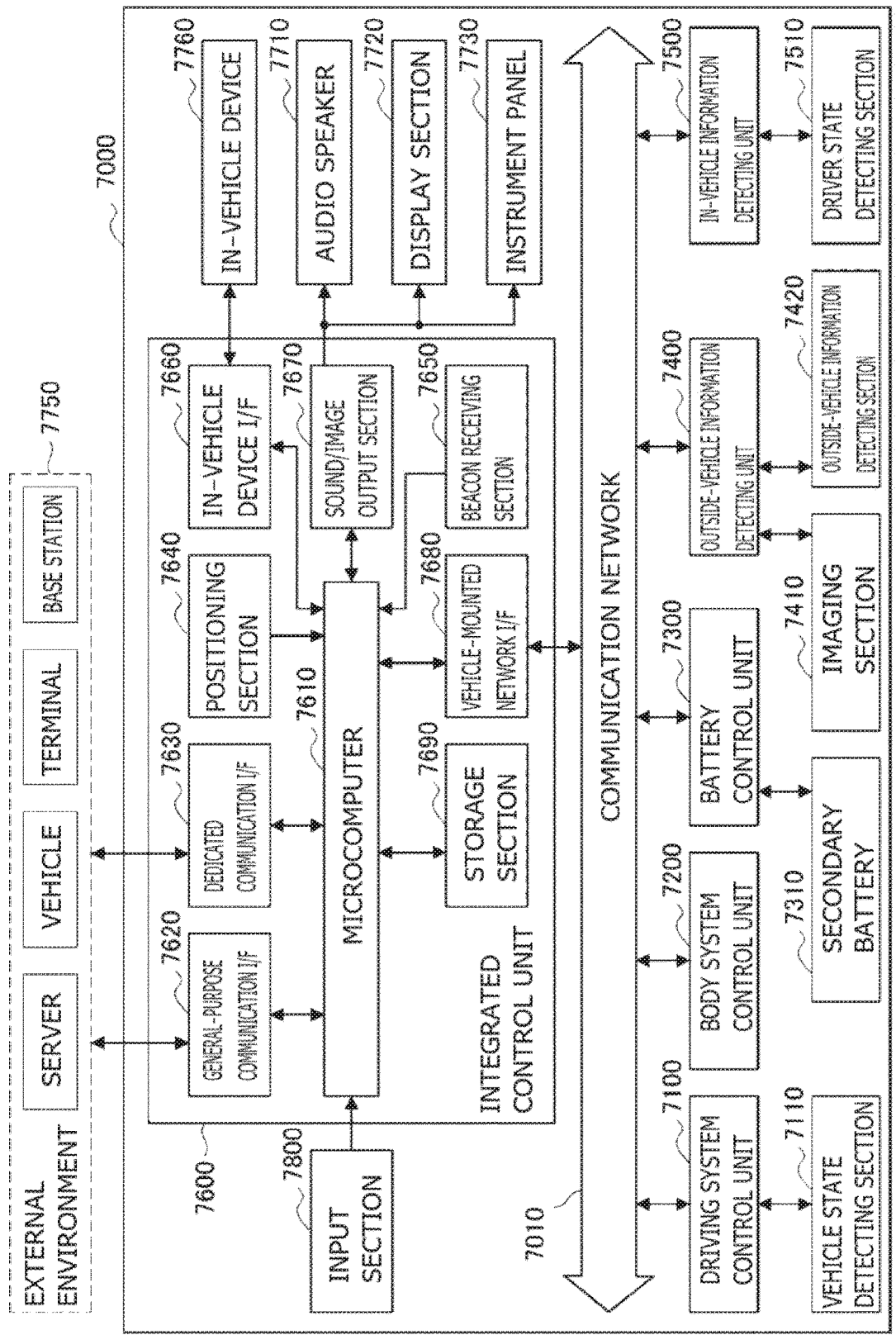
FIG. 10 is a block diagram depicting an example of schematic configuration of a vehicle control system.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 11:
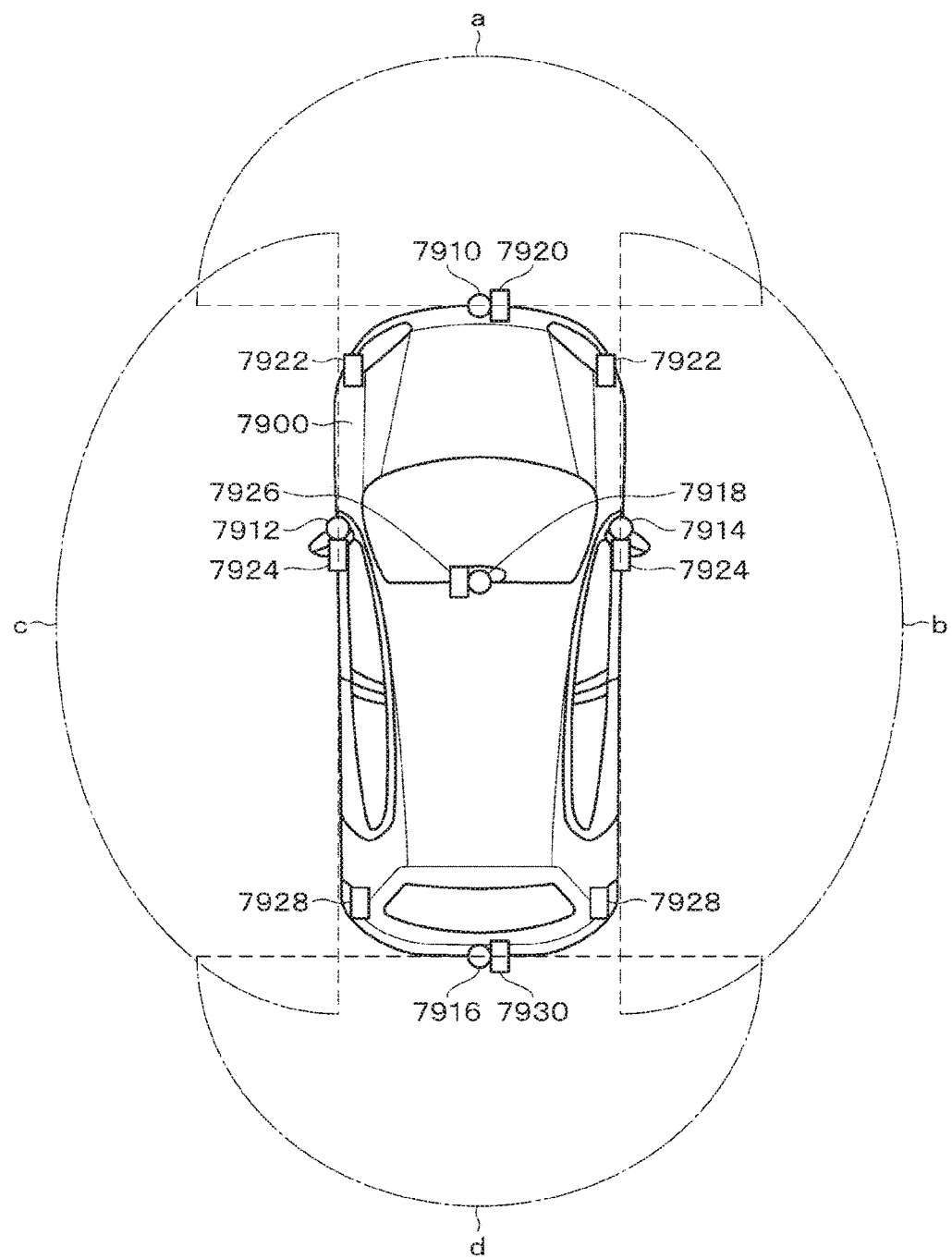
FIG. 11 is a diagram of assistance in explaining an example of installation positions of an outside-vehicle information detecting section and an imaging section.

FIG. 11 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program can be mounted in any of the control units, the computer program being intended to implement the functions of the image processing apparatuses 1 and 2 according to the present embodiments described using FIG. 1 and FIG. 7. Additionally, a computer-readable recording medium can also be provided in which such a computer program is installed. The recording medium is, for example, a magnetic disk, an optical disc, a magneto-optic disc, a flash memory, or the like. Additionally, the above-described computer program may be distributed, for example, via a network without using a recording medium.

In the vehicle control system 7000 described above, the image processing apparatuses 1 and 2 described using FIG. 1, and FIG. 7 can be applied to the outside-vehicle information detecting unit 7400 in the applied example depicted in FIG. 10. Additionally, the output section 110 according to the above-described embodiments can be applied to the sound/image output section 7670.

Additionally, at least some of the components of the image processing apparatuses 1 and 2 according to the present embodiments described using FIG. 1 and FIG. 7 may be implemented in a module (for example, an integrated circuit module constituted of one die) for the integrated control unit 7600 depicted in FIG. 10. Alternatively, the image processing apparatuses 1 and 2 according to the present embodiments described using FIG. 1 and FIG. 7 may be implemented by a plurality of control units of the vehicle control system 7000 depicted in FIG. 10.

4. Modified Examples

A plurality of embodiments of the present disclosure have specifically been described. However, the contents of the present disclosure are not limited to the above-described embodiments, and various modifications based on the technical concepts of the present disclosure can be made. Modified examples will be described below.

In the first embodiment, the edge detecting section 103 detects an edge on the basis of the depth image D, but no such limitation is intended. The input image I also includes the edge, and thus, the edge detecting section 103 may detect the edge on the basis of the input image I. For example, even in a case where the depth image D fails to be obtained due to an error in the depth sensor or the like, the first filter coefficient computing section 104 can compute the first filter coefficient based on the detection result for the edge. Note that the image in which the edge is detected may be dynamically varied according to a distance to an object (subject) or the like.

Additionally, the edge detecting section 103 may detect the edge on the basis of the depth image D and the input image I. Two images can be used to improve detection accuracy for the edge.

Additionally, in the second embodiment, the disturbance detecting section 107 detects disturbances on the basis of the depth image D, but no such limitation is intended. The input image I also includes the disturbances, and thus, the disturbance detecting section 107 may further detect the disturbances on the basis of the input image I. Two images can be used to improve detection accuracy for the edge. In this case, the disturbance detecting section 107 may detect the disturbances included in the depth image D and the input image I, using a method varying with image. This allows prevention of omission of detection that may occur depending on the type of the disturbances or the like.

The above description uses a visible image as the above-described input image I, but no such limitation is intended. The input image I may be an invisible light image such as an infrared image (non-visible light image). Additionally, the image may be an image obtained by synthesizing a visible image and an invisible light image. Such an image may allow visibility of the object to be improved and thus enables facilitation of detection of the edge, the details, and the disturbances.

In the above-described embodiment, the edge and the details are cited as the image properties. However, the present technique can be applied to other properties (for example, gradation (gray scale)).

Of the functions of the filter processing section according to the above-described embodiments, the function which sets the filter coefficient used for the filter processing and the function which executes the filter processing based on the filter coefficient may be executed by different components (for example, an IC (Integrated Circuit) and the like).

The present disclosure can also be implemented by an apparatus, a method, a program, a system, and the like. For example, a program executing the functions described above in the embodiments is enabled to be downloaded, and an apparatus not including the functions described in the embodiments downloads and installs the program in the apparatus. Then, the control described in the embodiments can be performed in the apparatus. The present disclosure can be realized by a server distributing such a program. Additionally, the matters described in the embodiments and the modified example can be combined together, as appropriate.

The present disclosure can take the following configuration.

(1)

An image processing apparatus including:

an image processing section configured to execute filter processing using a filter coefficient set at least on the basis of a detection result for details based on a first image and a detection result of detection of a disturbance performed on a second image.

(2)

The image processing apparatus according to (1), in which the first image and the second image each include an identical input image aligned with a predetermined depth image (3)

The image processing apparatus according to (1), in which the first image includes an input image different from a depth image corresponding to the second image.

(4)

The image processing apparatus according to (2), in which the filter coefficient further includes a coefficient set on the basis of any of a detection result for an edge based on the depth image aligned with the input image, a detection result for the edge based on the input image, or a detection result for the edge based on the depth image and the input image.

(5)

The image processing apparatus according to (2), in which the depth image includes an image obtained on the basis of a sensor transmitting the disturbance.

(6)

The image processing apparatus according to (3), in which the depth image includes an image obtained on the basis of a sensor not transmitting the disturbance.

(7)

The image processing apparatus according to (6), in which the filter coefficient further includes a coefficient set on the basis of any of a detection result for an edge based on the depth image aligned with the input image, a detection result for the edge based on the input image, or a detection result for the edge based on the depth image and the input image.

(8)

The image processing apparatus according to (6), in which the disturbance is detected on the basis of the depth image or the input image and the depth image.

(9)

The image processing apparatus according to (4), in which the filter coefficient includes a coefficient obtained by normalizing information based on a first filter coefficient set on the basis of the detection result for the edge, a second filter coefficient set on the basis of the detection result for the details, and a third filter coefficient set on the basis of the detection result for the disturbance.

(10)

The image processing apparatus according to (9), in which the first filter coefficient includes a coefficient set in such a manner as to leave the edge, the second filter coefficient includes a coefficient set in such a manner as to leave the details, and the third filter coefficient includes a coefficient set in such a manner as to remove the disturbance.

(11)

The image processing apparatus according to (10), in which 0 is set as the third filter coefficient for a pixel including the disturbance.

(12)

The image processing apparatus according to any one of (2) to (11), in which the input image includes a visible light image, an invisible light image, or an image obtained by synthesizing a visible light image and an invisible light image.

(13)

The image processing apparatus according to any one of (1) to (12), in which the disturbance includes a granular minute substance flying in air.

(14)

The image processing apparatus according to (13), in which the disturbance includes at least one of a raindrop, snow, fog, sleet, hailstone, yellow sand, dust, a fly, or a mosquito.

(15)

The image processing apparatus according to any one of (2) to (14), in which the image processing apparatus executes the filter processing on the input image subjected to the alignment.

(16)

The image processing apparatus according to any one of (1) to (15), including:

an output section configured to output an image subjected to the filter processing by the image processing apparatus.

(17)

An image processing method including:

executing, by an image processing section, filter processing using a filter coefficient set at least on the basis of a detection result for details based on a first image and a detection result of detection of a disturbance performed on a second image.

(18)

A program causing a computer to execute an image processing method including executing, by an image processing section, filter processing using a filter coefficient set at least on the basis of a detection result for details based on a first image and a detection result of detection of a disturbance performed on a second image.

REFERENCE SIGNS LIST 1, 2 . . . Image processing apparatus, 102 . . . Alignment section, 103 . . . Edge detecting section, 104 . . . First filter coefficient computing section, 105 . . . Detail detecting section, 106 . . . Second filter coefficient computing section, 107 . . . Disturbance detecting section, 108 . . . Third filter coefficient computing section, 109 . . . Filter processing section, 110 . . . Output section

The invention claimed is:

1. An image processing apparatus, comprising:
an image processing section configured to:
set a specific filter coefficient based on a first detection result and a second detection result, wherein
the first detection result indicates details of a first image,
the second detection result indicates disturbance in a second image, and
each of the first image and the second image includes an identical input image aligned with a depth image; and
execute a filter process based on the set specific a filter coefficient.

2. The image processing apparatus according to claim 1, wherein the image processing section is further configured to set the specific filter coefficient based at least one of:
a third detection result that indicates an edge of the depth image, wherein the depth image is aligned with the identical input image,
a fourth detection result that indicates an edge of the identical input image, or
a fifth detection result that indicates the edge of the depth image and the identical input image.

3. The image processing apparatus according to claim 2, further comprising:
a first filter coefficient computing section configured to set a first filter coefficient based on the third detection result;
a second filter coefficient computing section configured to set a second filter coefficient based on the first detection result; and
a third filter coefficient computing section configured to set a third filter coefficient based on the second detection result, wherein the image processing section is further configured to:
execute normalization based on the set first filter coefficient, the set second filter coefficient, and the set third filter coefficient; and
set the specific filter coefficient based on the normalization.

4. The image processing apparatus according to claim 3, wherein
the first filter coefficient computing section is further configured to set the first filter coefficient so as to retain the edge of the depth image, the second filter coefficient computing section is further configured to set the second filter coefficient so as to retain the details of the second image, and the third filter coefficient computing section is further configured to set the third filter coefficient so as to remove the disturbance.

5. The image processing apparatus according to claim 4, wherein the third filter coefficient computing section is further configured to set 0 as the third filter coefficient for a pixel, of the second image, that includes the disturbance.

6. The image processing apparatus according to claim 1, wherein the depth image is based on an output of a sensor that transmits the disturbance.

7. The image processing apparatus according to claim 1, wherein the identical input image includes one of a visible light image, an invisible light image, or an image based on synthesis of the visible light image and the invisible light image.

8. The image processing apparatus according to claim 1, wherein the disturbance includes a granular minute substance in air.

9. The image processing apparatus according to claim 8, wherein the disturbance further includes at least one of a raindrop, snow, fog, sleet, hailstone, yellow sand, dust, a fly, or a mosquito.

10. The image processing apparatus according to claim 1, wherein the image processing apparatus is further configured to execute the filter process on the identical input image aligned with the depth image.

11. The image processing apparatus according to claim 1, further comprising an output section configured to output a third image based on the execution of the filter process.

12. An image processing method, comprising:
setting a filter coefficient based on a first detection result and a second detection result, wherein
the first detection result indicates details of a first image,
the second detection result indicates disturbance of a second image, and
each of the first image and the second image includes an identical input image aligned with a depth image; and
executing, by an image processing section, a filter process based on the set filter coefficient.

13. A non-transitory computer-readable medium having stored thereon, computer-executable instructions which, when executed by a computer, cause the computer to execute operations, the operations comprising:
setting a filter coefficient based on a first detection result and a second detection result, wherein
the first detection result indicates details of a first image,
the second detection result indicates disturbance of a second image, and
each of the first image and the second image includes an identical input image aligned with a depth image; and
executing, by an image processing section, a filter process based on the set filter coefficient.

14. An image processing apparatus, comprising:
an image processing section configured to:
set a filter coefficient based on a first detection result and a second detection result, wherein
the first detection result indicates details of a first image,
the second detection result indicates disturbance of a second image, the first image includes an input image different from a depth image, and the depth image corresponds to the second image; and execute a filter process based on the set filter coefficient.

15. The image processing apparatus according to claim 14, wherein the depth image is based on an output of a sensor that restricts transmission of the disturbance.

16. The image processing apparatus according to claim 14, wherein the image processing section is further configured to set the filter coefficient based on at least one of:

a third detection result that indicates an edge of the depth image, wherein the depth image is aligned with the input image, a fourth detection result that indicates an edge of the input image, or a fifth detection result that indicates the edge of the depth image and the input image.

17. The image processing apparatus according to claim 14, further comprising a disturbance detection section configured to detect the disturbance based on one of:

the depth image, or the input image and the depth image.

* * * * *